United States Patent [19]

Rule

[11] 4,341,811
[45] Jul. 27, 1982

[54] FLUID NON-DAIRY CREAMER

[75] Inventor: Charles E. Rule, Lakewood, Ohio

[73] Assignee: SCM Corporation, New York, N.Y.

[21] Appl. No.: 254,467

[22] Filed: Apr. 15, 1981

[51] Int. Cl.³ ............................................. A23C 11/00
[52] U.S. Cl. .................................... 426/602; 426/613
[58] Field of Search ..................... 426/330.6, 569, 602, 426/613

[56] References Cited

U.S. PATENT DOCUMENTS

| | | | |
|---|---|---|---|
| 3,563,761 | 2/1971 | Ellinger | 426/609 X |
| 3,695,889 | 10/1972 | Ingerson | 426/602 X |
| 3,712,865 | 1/1973 | Evans et al. | 252/312 |
| 3,958,033 | 5/1976 | Sims | 426/602 |
| 4,025,659 | 5/1977 | Cho | 426/613 |
| 4,045,589 | 8/1977 | Petrowski et al. | 426/609 |
| 4,046,926 | 9/1977 | Gardiner | 426/613 |
| 4,092,438 | 5/1978 | Tonner | 426/601 |
| 4,199,605 | 4/1980 | Kahn et al. | 426/613 X |
| 4,242,364 | 12/1980 | Buddemeyer et al. | 426/613 X |
| 4,273,790 | 6/1981 | Bosco et al. | 426/602 X |

FOREIGN PATENT DOCUMENTS 2014426A 8/1979 United Kingdom.

Primary Examiner—Robert A. Yoncoskie
Attorney, Agent, or Firm—Richard H. Thomas

[57] ABSTRACT

A protein-free, lipoidal coffee whitener, the functional ingredients of which consist essentially of a pasteurized, homogenized water-rich lipoidal emulsion of about 6-15 edible fat and about 0.6-2 mixed lipoidal emulsifier, and water, said fat having a Wiley Melting Point below about 120° F., said emulsifier constituting about 0.3-1% low HLB mono- and diglyceride or propylene glycol partial ester of fat-forming acids and about 0.3-1% high HLB polyglycerol ester having an HLB value above about 10, a hydroxyl value of about 400-600, a saponification number of about 60-100, and acid values of less than about 10.

9 Claims, No Drawings

FLUID NON-DAIRY CREAMER

The present invention relates to fluid non-dairy creamers and, more specifically, to such creamers commonly referred to as coffee whiteners adapted to be added to acidic, hot beverages such as coffee.

BACKGROUND OF THE PRESENT INVENTION

A typical coffee whitener formulation has the following composition:

| | |
|---|---|
| Vegetable fat | 6–12% |
| Sweetening agents (sugar, corn syrup solids, corn syrup) | 4–10% (solids basis) |
| Protein | .75–1.5% |
| Emulsifier | 0.2–1.0% |
| Buffer | 0.1–0.5% |
| Stabilizer | 0.02–0.15% | the remainder being water. A similar formulation is described in prior U.S. Pat. No. 3,563,761, the protein being sodium caseinate.

As pointed out in the U.S. Pat. No. 3,563,761 patent, the sodium caseinate serves the function in a fat/water emulsion of encapsulating the fat globules, as a film former, and binding water, thus stabilizing the emulsion and preventing oil/water separation.

Sodium caseinate, however, is in short supply and its use in food compositions adds substantially to the cost of such compositions. In addition, it is necessary, when using a protein such as sodium caseinate, to also add a buffer to prevent "feathering" of the protein. Most coffees have a low pH near the isoelectric point of the protein which causes the protein to coagulate when the whitener is added to the coffee, in turn resulting in a breakdown of the emulsion. The buffering salts hydrolyze to slightly basic solutions, increasing the pH to above the isoelectric point.

Common, acceptable buffers are disclosed in prior U.S. Pat. No. 4,092,438 and include such phosphate salts as dipotassium phosphate and certain citrate salts.

Many recent developments have been made directed to the problems of emulsion stability and feathering in coffee whiteners. In addition to the two patents mentioned above, reference can be had to the following representative patents:

U.S. Pat. No. 3,695,889 (Avoset) is on the use of an emulsifier blend comprising polysorbate 60, sodium stearoyl-2-lactylate, and propylene glycol monostearate in a buffered/caseinate product.

U.S. Pat. No. 3,712,865 (Lever Bros.) describes acylating protein in oil-in-water emulsions. This patent, as with the U.S. Pat. No. 3,563,761 patent, discusses the importance of protein to provide an interface and prevent oil droplet coalescence.

U.S. Pat. No. 3,958,033 (General Foods) describes a protein-free non-homogenized emulsion containing nearly 50% sugar, about 25% water, and about 25% lipid including fat and an emulsifier blend comprising a lactylate or fumurate salt, or succinylated monoglyceride, alone, or in combination with an adjunct emulsifier such as propylene glycol monostearate.

U.S. Pat. No. 4,025,659 (Ralston-Purina Co.) describes a coffee whitener composition containing soy protein isolate which is said to exhibit substantial resistance to feathering or oil separation in hot coffee, provided the soy is used in combination with caseinate.

U.S. Pat. No. 4,045,589 (Carnation Co.) describes a coffee whitener which is protein-free but which contains a chemically modified dextrinized starch having a lipophilic character.

U.S. Pat. No. 4,046,926 (General Foods Ltd.) describes a non-dairy creamer composition based on sodium caseinate and containing effective amounts of sodium carbonate and a phosphate or citrate for what is said to be improved resistance to feathering.

In all of the above patents, except U.S. Pat. Nos. 3,958,033 and 4,045,589, caseinate or other protein is considered an essential ingredient. Only in the two exceptions, is there described a composition which is protein-free. In the U.S. Pat. No. 3,958,033 patent, the composition disclosed is a concentrate which is very viscous and obtaining a stable emulsion would not be difficult. Contributing to the viscosity is a large amount of sugar and a consumer could well find the sweetness level to be objectionable. The fat level also would tend to make the formulation representative of a rich cream rather than a conventional coffee whitener. Similar disadvantages exist with regard to the U.S. Pat. No. 4,045,589 patent.

In addition to the above patents, reference can be had to the publication Process Biochemistry, December 1972, by Stewart & Hughes. On page 28, it is disclosed that blends of the polyglycerol estes Admul 19 and 57, alone or in combination with monoglycerides, are commonly used in liquid and powdered coffee whiteners. There is nothing to indicate that the coffee whiteners referred to are other than the conventional sodium caseinate-containing whiteners.

BRIEF DESCRIPTION OF THE PRESENT INVENTION

The present invention resides in the discovery that a non-dairy coffee whitener, adapted to be added to an acidic, hot environment, can be prepared by pasteurizing and homogenizing a water-rich lipoidal emulsion consisting essentially of about 6–15% edible fat, about 0.6–2% mixed lipoidal emulsifier, and water, the fat having a Wiley Melting Point below about 120° F., said emulsifier constituting about 0.3–1% low HLB mono- and diglyceride or propylene glycol partial ester of fat-forming acids and about 0.3–1% high HLB polyglycerol ester having an HLB value above about 10, a hydroxyl value of about 400–600, a saponification number of about 60–100 and acid values of less than about 10.

Preferred polyglycerol esters are octaglycerol monooleate and octaglycerol monostearate.

It is a totally surprising, fortuitous, and unexpected discovery that the coffee whitener formulation of the present invention, being free of protein, can be added to an acidic, hot environment, such as hot coffee, without coalescence of the fat globules. Although not bound by any particular theory, it is believed that this is due to a unique combination of factors; namely, concentrations, wet basis, of the lipid ingredients, the combination of specific lipid ingredients stated, and homogenization preferably carried out to obtain an average particle size of less than about 2–3 microns for the fat globules.

In addition to the lipid ingredients stated, which for purposes of the present application may along with water be considered the functional ingredients, the coffee whitener of the present invention may also contain such non-functional ingredients as flavoring, e.g. sugar, preservatives, and a small amount of thickeners.

Advantages of the present invention should be apparent. A principal advantage is that the coffee whitener of the present invention has a relatively thin viscosity, representative of conventional fluid, casein-containing whiteners. In addition, the whitener formulation does not require a high sugar content and can be sweetened to whatever level of sweetness is desired. The formulation of the present invention also has the advantage of long shelf life and, being free of protein such as caseinate, relatively low cost.

DETAILED DESCRIPTION OF THE PRESENT INVENTION

Preferred low HLB emulsifiers of the present invention are partial fatty acid esters of glycerol and propylene glycol having an HLB value not substantially greater than about 5 and a Capillary Melting Point sufficiently high to have a normally hard consistency at room temperature of about 70° F. Emulsifiers falling within this category are mono- and diglycerides which are in normally solid form. One such mono- and diglyceride is Dur-em 117 (trademark SCM Corporation), having an HLB value of about 2.8, made from 5 max. IV hydrogenated soybean oil, having a Capillary Melting Point of about 145°-150° F. and 40% minimum alpha-monoglyceride content. This emulsifier is marketed with an amount of citric acid to help protect flavor.

Another such mono- and diglyceride is Dur-em 127 (trademark SCM Corporation), marketed in white bead form, having an alpha- monoglyceride content of 40% minimum, an IV of 5 (max.) and a Capillary Melting Point of about 140°-145° F. A third such emulsifier is Dur-em 207, sold in white bead or flake form, having an alpha-monoglyceride content of 52% minimum, an IV of 5 (max.) and a Capillary Melting Point of about 140°-146° F. Both Dur-em 127 and Dur-em 207 are marketed with an amount of citric acid to help protect flavor.

A suitable propylene glycol ester is Durpro 107 (trademark SCM Corporation), marketed in flake form, having a propylene glycol mono- and diester content of about 50-60%, a monoglyceride content of about 10-15%, and a Capillary Melting Point of about 115°-125° F. This emulsifier has an HLB value of about 2.2.

The above emulsifiers are normally hard, making them convenient to use. However, a soft or plastic emulsifier can also be used, for instance Dur-em 114 (trademark SCM Corporation), a plastic mono- and diglyceride having about 40% minimum mono- content, an IV of 70-75, and a Capillary Melting Point of about 110°-120° F. Also useful is glycerol monooleate (GMD), marketed by Emery Industries under the trademark Emrite 6009, comprising mono- and diglycerides of food grade oleic acid having an IV of at least 60, at least 46% alpha-monoglyceride, less than 7% free glycerine and 9.5% propylene glycol. A similar composition is Atmos 300, markted by ICI United States, Inc.

The partial glycerol ester emulsifier can also be a distilled monoglyceride such as Myverol 18-06 and 18-85 (trademarks Eastman Chemical), containing about 90% monoglyceride.

The polyglycerol esters of the present invention are generally a mixture of unsaturated and saturated fatty acid esters of a mixture of polyglycerols in which the range of polyglycerol is from octaglycerol to decaglycerol. The unsaturated and saturated fatty acids generally contain 16 to 18 carbon atoms and are typically derived from corn oil, cottonseed oil, lard, palm oil, peanut oil, safflower oil, sesame oil, soybean oil, tallow, and tall oil and the fatty acids derived from these substances either hydrogenated or unhydrogenated. The polyglycerol esters are prepared by the polymerization of glycerol with an alkaline catalyst as exemplified in U.S. Pat. No. 3,637,774, or an acid catalyst as exemplified in U.S. Pat. No. 3,968,169 and then esterifying the polyglycerol by reaction with fatty acids in a direct esterification or by reaction with fats and oils in an interesterification process. Suitable high HLB polyglycerol esters broadly have a hydroxyl value of about 400-600, a saponification number of about 60-100, and acid value of less than about 10.

A preferred high HLB polyglycerol ester emulsifier component of the present invention is selected from the group consisting of octaglycerol monooleate (8-1-O) and octaglycerol monostearate (8-1-S). These two emulsifiers are marketed by SCM Corporation under the tradmarks Santone 8-1-O and Santone 8-1-S, respectively. Santone 8-1-O is described as a normally liquid polyglycerol ester of fatty acids having an IV of about 25-35, an HLB of about 13 and a Saponification Value of about 77-88. It contains about 60-68% oleic acid and has a hydroxyl number of about 500-570 and an acid number of under 4.1. Santone 8-1-S is a similar such ester, but normally solid, having an IV of about 3 max., a Mettler Dropping Point of 52°-57° C., an HLB of about 13, and a Saponification Value of about 77-88. By normally solid or liquid, it is meant that phase which exists at room temperature (about 70° F.). By "high HLB", it is meant having an HLB value above about 10. Other suitable polyglycerol esters are decaglycerol monostearate, decaglycerol monoshortening, decaglycerol monooleate, decaglycerol monolaurate, decaglycerol tristearate, and decaglycerol trioleate.

Given a fat content of about 6-15% and a total emulsifier content of about 0.6-2%, this results in an emulsion consisting essentially of, on a wet basis, about 6.6-17% total lipid, the balance being water. A preferred lipid content is about 10-12%. The viscosity of the emulsion of the present invention is less than about 20 centipoises, at 40° F., as measured on a Brookfield Viscometer, Model LVF, using a No. 1 spindle at 60 rpm. At about 11% lipid, and roughly 40° F., the Brookfield viscosity is about 5-6 centipoises. This viscosity can be increased somewhat by addition of thickeners and carbohydrate sweetener. Still, the viscosity of the emulsions of the present invention is quite low by comparison with conventional oil-water emulsions, and yet the emulsions under refrigeration, remain stable for prolonged periods, e.g. six weeks, which at the viscosities stated, is totally surprising and unexpected. Again, the viscosities are those comparable to conventional protein-containing creamers or whiteners.

One fat which can be used in the present invention is a nonlauric fate (that is, one having a low lauric acid content—$C_{12}$) which is hydrogenated ane elaidinized to provide a desired hardness or high solids content sufficient to maintain a substantially plastic consistency throughout a wide temperature range, and at the same time a rapid melting at elevated temperatures above about 110° F. without retention of a waxy mouth feel.

One suitable such elaidinized fat is a partially hydrogenated vegetable oil (cottonseed or soybean) marketed under the trademark Duromel, (SCM Corporation) having an IV of 60-65, a Wiley Melting Point of 101°-105° F., and a solid fat index of:

| Temperature °F. | Approx. Solid-Fat Index |
| --- | --- |
| 50 | 56 |
| 70 | 43 |
| 80 | 36 |
| 92 | 16 |
| 100 | 4 max. |

Duromel has a free fatty acid content of 0.1 max.

Another suitable such fat that can be used in the composition of the present invention is a partially hydrogenated vegetable oil (cottonseed or soybean) marketed under the trademark Kaomel (SCM Corporation) having a Wiley Melting Point of 97°–101° F., an IV of 59, and a solid-fat index as follows:

| Temperature °F. | Approx. Solid-Fat Index |
| --- | --- |
| 50 | 72 |
| 70 | 63 |
| 80 | 55 |
| 92 | 21 |
| 100 | 3 max |

Wiley Melting Point is determined by AOCS method Cc-2-38. The approximate solid-fat index is determined by AOCS method Cd-10-57.

Still, a third fat that can be used is a partially hydrogenated 5 max. IV coconut oil marketed by SCM Corporation under the trademark Hydrol 100. This fat has a Wiley Melting Point in the range of 98°–102° F., a free fatty acid content of 0.05% (maximum), and a minimum AOM of 100. The SFI data for Hydrol 100 is as follows:

| Temperature °F. | Approx. Solid-Fat Index |
| --- | --- |
| 50 | 61–67 |
| 70 | 38–44 |
| 80 | 11–17 |
| 92 | 3–7 |
| 100 | 0–2 |

One suitable oil useful in the present invention is coconut oil marketed by SCM under the trademark Konut. This oil has a Wiley Melting Point of 75°–80° F., an AOM value of 100 hours minimum, and a free fatty acid content of 0.05% maximum.

Another fat useful in the present invention is a partially hydrogenated oil selected from the group consisting of coconut, palm kernel, palm, soybean and cottonseed, marketed under the trademark Paramount X by SCM Corporation, the fat having a Wiley Melting Point of 112°–114° F. and SFI data as follows:

| Temperature °F. | Approx. Solid-Fat Index |
| --- | --- |
| 50 | 67 |
| 70 | 56 |
| 80 | 40 |
| 92 | 26 |
| 100 | 13 |
| 110 | 6 |

Still one additional fat that may be employed is butterfat which typically has a Wiley Melting Point of about 95° F., an IV of about 31.4, a $C_{16}$ or lower content of about 50%, and an SFI as follows

| Temperature °F. | Approx. Solid-Fat Index |
| --- | --- |
| 50 | 33 |
| 70 | 14 |
| 80 | 10 |
| 92 | 3 |
| 100 | 3 |

Butterfat-containing fluid whiteners may have a shelf life somewhat less than those containing a hydrogenated and/or elaidinized fat.

In addition to the above ingredients, the coffee whitener of the present invention can contain additional additives as BHA, BHT, citric acid and the like, as preservatives. Sweeteners such as corn syrup, saccharin, and sugar, can be employed in the present invention, and are considered non-functional additives or ingredients. Normally, they would be employed in small amounts to add the same sweetness level as exists in ordinary dairy cream or conventional non-dairy coffee whiteners. In addition, flavorants such as vanillan or butter or cream flavoring can be added, as well as colorants, including titanium dioxide. Gum or starch thickeners might also be added, in small amounts. Illustrative polysaccharides that may be employed in the present invention are water-dispersible cellulose derivatives such as sodium carboxymethylcellulose, gum tragacanth, gum acacia, gum karaya, locust bean gum, cellulose ethers such as methyl cellulose, low methoxy pectin, propylene glycol alginate, sodium alginate, gellatinized starches and starch derivatives such as hydroxypropyl starch, and Avicel RC 581 (trademark FMC Corporation), a mixture of 89% cellulose gel (microcrystalline celluose and 11% cellulose gum), and sodium carboxymethylcellulose.

Such thickeners are employed in the amount of less than about 0.5%.

EXAMPLE 1

A whitener was produced from the following ingredients:

| Ingredient | Percent |
| --- | --- |
| Partially hydrogenated vegetable fat (Duromel) | 10 |
| Polyglycerol ester (8-1-S) | .55 |
| Mono- and diglyceride (Dur-em 117) | .5 |
| Water | 89.5 |
| Sweetener | Optional |
| Flavor | Optional |
| Color | Optional |
| | 100% |

The coffee whitener was prepared by heating water to 130° F. and adding the lipids (Duromel, polyglycerol ester and mono- diglyceride) to it. The mix then was heated to 160° F. and held for 15 minutes, following which it was homogenized at 2500/500 psi through a two-stage homogenizer. Homogenization follows conventional dairy technology. The mix was rapidly cooled to 40° F., packaged and refrigerated at 40° F.

In the above formulation, 36 DE corn syrup can be used at a level of 12%, with excellent results.

An Agtron instrument was used to measure reflectance. This instrument is made by Magnuson Engineers of San Jose, Calif. In the test, the whitened coffee was poured into an Agtron cup to three-quarter full and the cup was placed in the instrument Reflectance Colormeter, which has been standardized with a 07-44 disc using a green filter. High reflectance readings were indicative of greater whitening power. The whitener gave reflectance readings consistantly of about 41–42. By comparison, Coffee-mate, a caseinate-containing commercial whitener, also gives a reflectance reading of about 42.

The whiteners of this Example were found to resist oil separation and rancidity for long periods under refrigeration, up to two month's time. Only very slight oil droplets on top of the emulsion were noted. The amount was considered acceptable. The whitener had a pH of about 6–6.2.

If desired, it is possible to blend the lipid ingredients together at an elevated temperature of about 160° F., to render all the lipids molten, and then subjected the same to rapid cooling in a plate-type cooler or swept-wall heat exchanger to form a homogeneous solid mass of such ingredients. This can be facilitated using a propylene glycol coupling agent as disclosed in prior U.S. Pat. No. 3,230,090, to Theodore J. Weiss. The disclosure of this patent is incorporated by reference herein. Then, for making the coffee whitener emulsion of the present invention, it is a simple matter to again melt the lipid ingredients and subject them to high-shear mixing with the right amount of water and water soluble ingredients, if any. Homogenization is carried out to produce an emulsion having an average particle size less than about 2–3 microns. At homogenization pressures of 2500/500, an average particle size of less than about 1 micron is obtained.

Both formulations of this Example had a viscosity after homogenization of about 5 centipoises at about 40° F.

Homogenization is critical to produce a desired size of the fat globules, less than about 2–3 microns (average particle size), preferably less than about 1 micron, for the purposes of emulsion stability and whitening power. Whereas homogenization pressures of 2500/500 in a two-stage homogenizer produces excellent results, good results can also be obtained at other pressures ranging from 1000 to 6000, using either a single or two-stage homogenizer.

In the above Example, pasteurization was carried out at 160° F. and held for 15 minutes. It is an aspect of the present invention that the coffee whitener formulation can also be subjected to ultra-high pasteurization at temperatures of 280°–300° F. for 2–6 seconds, without adverse effects. Protein-containing coffee whiteners subjected to such temperatures are likely to suffer from protein breakdown. Ultra-high pasteurization offers the advantage of extended shelf life.

EXAMPLE 2

The purpose of this Example was to establish functionality at varying levels of polyglycerol ester and mono- and diglyceride with a fat such as Duromel. The whiteners were produced from the following ingredients:

| Ingredient | Percent |
| --- | --- |
| Partially hydrogenated vegetable fat (Duromel) | 10 |
| Emulsifier blend | variable |
| Water | balance |
|  | 100% |

The following Table gives details with regard to the emulsifier blends employed and results obtained. All of the emulsions were homogenized at 5000/1000 psi in a two-stage homogenizer.

TABLE 1

| Sample | Emulsifier Blend* | | Viscosity | Agtron Reading | Oil Droplets In Coffee |
| --- | --- | --- | --- | --- | --- |
| | 8-1-S | Mono- and diglyceride | | | |
| A | .55 | .3 | 40° F./5 cps | 141° F./41 | slight |
| G | .55 | .5 | 39° F./6 cps | 145° F./41 | slight |
| H | .45 | .5 | 41° F./6 cps | 147° F./40 | slight |

*Weight percent based on total emulsion weight.

Based on the data of the above table and other data, it was concluded that mono- diglyceride and polyglycerol ester contents above about 0.3% each based on the total weight of the emulsion, could give Agtron readings above about 40 with only minimal oil drop formation on the top of the coffee. The formation of slight oil droplets was considered acceptable. Acceptable ranges for the mono- diglycerides and polyglycerol esters are about 0.3–1% for each ingredient. It was also found that approximately equal proportions of each ingredient provided optimum results.

What is claimed is:

1. A protein-free, lipoidal coffee whitener, the functional ingredients of which consist essentially of
   a pasteurized, homogenized water-rich lipoidal emulsion of about 6–15% edible fat and about 0.6–2% mixed lipoidal emulsifier, and water, said fat having a Wiley Melting Point below about 120° F., said emulsifier constituting about 0.3–1% low HLB, not substantially greater than 5, mono-and diglyceride or propylene glycol partial ester of fat-forming acids and about 0.3–1% polyglycerol ester of fatty acids having an HLB value above about 10, a hydroxyl value of about 400–600, a saponification number of about 60–100, and acid values of less than about 10.

2. The coffee whitener of claim 1 wherein said polyglycerol ester is octaglycerol monooleate or octaglycerol monostearate.

3. The coffee whitener of claim 2 prepared by blending the lipid ingredients with water at an elevated temperature for a time and temperature sufficient to pasteurize or sterilize the same, then homogenizing the blend in an homogenizer at pressures between about 1000 and 6000 psig, followed by rapid cooling in a plate or other cooler to about 40° F. and packaging of the same.

4. The coffee whitener of claim 2 wherein said mixed lipoidal emulsifier comprises a mono- and diglyceride having an HLB value not substantially greater than about 5 and said polyglycerol ester in about equal proportions.

5. The coffee whitener of claim 4 wherein the total lipid content of said lipoidal emulsion is about 10%.

6. The coffee whitener of claim 1 containing sugar added in low amounts to a sweetness level existing in ordinary cream.

7. The coffee whitener of claim 1 having a viscosity less than about 20 centipoises at 40° F. as measured on a Brookfield Viscometer, Model LVF, using a No. 1 spindle at 60 rpm.

8. The coffee whitener of claim 1 wherein the fat has an AOM stability of at least about 1000 hours.

9. The coffee whitener of claim 1 homogenized to an average particle size of less than about 1 micron.

* * * * *

UNITED STATES PATENT AND TRADEMARK OFFICE
CERTIFICATE OF CORRECTION

PATENT NO. : 4,341,811
DATED : July 27, 1982
INVENTOR(S) : Charles E. Rule

It is certified that error appears in the above–identified patent and that said Letters Patent are hereby corrected as shown below:

Column 8, line 65, change "1000 hours" to --100 hours--.

Signed and Sealed this

Nineteenth Day of October 1982

[SEAL]

Attest:

GERALD J. MOSSINGHOFF

Attesting Officer

Commissioner of Patents and Trademarks